United States Patent
Lin et al.

(10) Patent No.: US 12,158,513 B2
(45) Date of Patent: Dec. 3, 2024

(54) HANDOVER METHOD AND APPARATUS IN SATELLITE COMMUNICATIONS

(71) Applicant: Huawei Technologies Co., Ltd., Shenzhen (CN)

(72) Inventors: Meixin Lin, Hangzhou (CN); Yunfei Qiao, Hangzhou (CN); Xian Meng, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 17/609,326

(22) PCT Filed: Mar. 10, 2020

(86) PCT No.: PCT/CN2020/078655
§ 371 (c)(1),
(2) Date: Nov. 5, 2021

(87) PCT Pub. No.: WO2020/192416
PCT Pub. Date: Oct. 1, 2020

(65) Prior Publication Data
US 2022/0217607 A1    Jul. 7, 2022

(30) Foreign Application Priority Data
Mar. 26, 2019 (CN) .......................... 201910232727.5

(51) Int. Cl.
*H04W 36/32* (2009.01)
*G01S 19/25* (2010.01)
(Continued)

(52) U.S. Cl.
CPC .......... *G01S 19/256* (2013.01); *G01S 19/258* (2013.01); *H04W 36/165* (2013.01);
(Continued)

(58) Field of Classification Search
None
See application file for complete search history.

(56) References Cited

U.S. PATENT DOCUMENTS 8,139,539 B2    3/2012  Jung et al.
10,506,483 B1 * 12/2019  Williamson ....... H04B 7/18584
(Continued)

FOREIGN PATENT DOCUMENTS

CN    1155192 A    7/1997
CN    103096409 A    5/2013
(Continued)

*Primary Examiner* — Kenny S Lin
(74) *Attorney, Agent, or Firm* — Leydig, Voit & Mayer, Ltd.

(57) ABSTRACT

This application provides a handover method and apparatus in satellite communications. The handover method in satellite communications in this application includes: obtaining, by a terminal device, ephemeris information of first satellite base stations, where the first satellite base stations are satellite base stations that cover the terminal device; determining, by the terminal device based on the ephemeris information, a destination satellite base station to which the terminal device needs to hand over; determining, by the terminal device based on the determined destination satellite base station, a first time at which the terminal device is to hand over to the destination satellite base station; and handing over, by the terminal device based on the determined first time, to a destination cell served by the destination satellite base station. This application reduces power consumption of the terminal device, saves air interface resources, and further avoids a signaling storm caused because a large quantity of terminal devices report measurement information at the same moment, thereby increasing a handover success rate.

23 Claims, 5 Drawing Sheets

(51) Int. Cl.
*H04W 36/16* (2009.01)
*H04W 84/06* (2009.01)
*H04W 36/00* (2009.01)
*H04W 36/08* (2009.01)
*H04W 36/36* (2009.01)

(52) U.S. Cl.
CPC .... *H04W 36/00837* (2018.08); *H04W 36/083* (2023.05); *H04W 36/322* (2023.05); *H04W 36/36* (2013.01); *H04W 84/06* (2013.01)

(56) References Cited

U.S. PATENT DOCUMENTS

| | | | |
|---|---|---|---|
| 2005/0212700 A1* | 9/2005 | Diggelen | G01S 19/05 |
| | | | 342/357.42 |
| 2007/0025296 A1 | 2/2007 | Jung et al. | |
| 2008/0170536 A1 | 7/2008 | Marshack et al. | |
| 2011/0098057 A1* | 4/2011 | Edge | H04L 67/52 |
| | | | 455/456.1 |
| 2011/0212733 A1* | 9/2011 | Edge | H04W 8/22 |
| | | | 455/466 |
| 2014/0354477 A1* | 12/2014 | Robinson | G01S 19/11 |
| | | | 342/357.78 |
| 2015/0271730 A1* | 9/2015 | Benammar | H04B 7/195 |
| | | | 455/436 |
| 2016/0041267 A1* | 2/2016 | Robinson | G01S 13/60 |
| | | | 342/357.51 |
| 2016/0323032 A1* | 11/2016 | Ulupinar | H04B 7/18541 |
| 2016/0323800 A1 | 11/2016 | Ulupinar et al. | |
| 2017/0230104 A1 | 8/2017 | Purkayastha et al. | |
| 2018/0292538 A1 | 10/2018 | Raghupathy et al. | |
| 2018/0376393 A1* | 12/2018 | Wu | H04L 5/26 |
| 2019/0245614 A1* | 8/2019 | Lucky | H04B 7/2041 |

FOREIGN PATENT DOCUMENTS

| | | | | |
|---|---|---|---|---|
| CN | 106341852 A | 1/2017 | | |
| CN | 106788678 A | 5/2017 | | |
| CN | 107105473 A | 8/2017 | | |
| CN | 107800472 A | 3/2018 | | |
| CN | 107852230 A | 3/2018 | | |
| CN | 108112281 A | 6/2018 | | |
| CN | 108141277 A | 6/2018 | | |
| CN | 108737959 A | * | 11/2018 | ........ H04W 36/0011 |
| CN | 109495156 A | 3/2019 | | |
| EP | 0637142 A1 | 2/1995 | | |
| RU | 2192095 C2 | 10/2002 | | |
| WO | 2017139067 A1 | 8/2017 | | |
| WO | 2017142584 A1 | 8/2017 | | |
| WO | 2017189862 A1 | 11/2017 | | |

\* cited by examiner

HANDOVER METHOD AND APPARATUS IN SATELLITE COMMUNICATIONS

CROSS-REFERENCE TO RELATED APPLICATIONS

This application is a National Stage of International Patent Application No. PCT/CN2020/078655, filed on Mar. 10, 2020, which claims priority to Chinese Patent Application No. 201910232727.5, filed on Mar. 26, 2019, both of which are hereby incorporated by reference in their entireties.

TECHNICAL FIELD

This application relates to communications technologies, and in particular, to a handover method and apparatus in satellite communications.

BACKGROUND

Geosynchronous satellites have long been used for mobile communication. However, geosynchronous satellites are subject to the geosynchronous satellite orbit (GSO). Therefore, a limited quantity of satellites can be deployed in the GSO. As an alternative solution of geosynchronous satellites, a communications system that uses a satellite constellation in a non-geosynchronous satellite orbit (NGSO), for example, a low earth orbit (LEO), has been designed, to provide communication coverage for the entire earth or most positions on earth. In an NGSO-based communications system, a satellite moves relative to a communications device (for example, a gateway or a terminal device) on the surface of the earth. In addition, the communications device on the surface of the earth may also be in a state of motion. For example, the communications device is located on a high-speed train or an airplane in motion. For example, a low earth orbit satellite moves relatively fast and is 1200 km high above the surface of the earth. Then, it takes approximately 100 minutes for the satellite to orbit the earth once. In this case, the satellite serves a terminal device for approximately 10 minutes. Therefore, the terminal device may hand over from one satellite to another satellite at a specific point in time.

In a handover process of a terminal device in a related technology, a base station indicates a terminal device to perform channel quality measurement. Then, the base station indicates, based on a measurement result, the terminal device to hand over a wireless link to a destination neighboring cell.

However, in satellite communications, a relatively long transmission delay exists between a satellite and a terminal device, because a distance between the satellite and the terminal device is relatively long, which is usually approximately 1000 km. In addition, the satellite is also in high-speed motion. Therefore, when the terminal device reports a measurement result, it is highly probable that when the satellite receives the measurement result reported by the terminal device, channel quality has significantly changed due to the following two factors: the transmission delay and the high-speed motion of the satellite. In addition, the motion of the satellite results in frequent handover of the terminal device, and the terminal device needs to repeatedly report measurement results. This not only increases power consumption of the terminal device, but also may cause a signaling storm in the system, ultimately leading to failure of handover.

SUMMARY

This application provides a handover method and apparatus in satellite communications, to reduce power consumption of a terminal device, save air interface resources, and further avoid a signaling storm caused because a large quantity of terminal devices report measurement information at the same moment, thereby increasing a handover success rate.

According to a first aspect, this application provides a handover method in satellite communications, including: A terminal device obtains ephemeris information of first satellite base stations. The first satellite base stations are satellite base stations that cover the terminal device. The terminal device determines, based on the ephemeris information, a destination satellite base station to which the terminal device needs to hand over. The terminal device determines, based on the determined destination satellite base station, a first time at which the terminal device is to hand over to the destination satellite base station. The terminal device hands over, based on the determined first time, to a destination cell served by the destination satellite base station.

In this embodiment, the terminal device determines the destination satellite base station based on position information of satellite base stations, and determines a time to hand over to the destination satellite base station. The terminal device hands over to the destination cell served by the destination satellite base station when the time arrives. A satellite orbits periodically, so that handover information determined by the terminal device also assumes periodicity. In addition, the terminal device may not calculate a handover time in a disconnected state. Therefore, the terminal device does not need to frequently measure channel quality and report a measurement result. This reduces power consumption of the terminal device, saves air interface resources, and further avoids a signaling storm caused because a large quantity of terminal devices report measurement information at the same moment. Moreover, there is a relatively high probability that link handover decided and led by a network side fails, because a satellite and a terminal operate on the move. However, a handover success rate can be increased when the destination satellite base station and the handover time are selected by the terminal device.

In a possible implementation, that a terminal device obtains ephemeris information of first satellite base stations includes: The terminal device sends an ephemeris information request to an ephemeris information network element, where the ephemeris information request includes position information of the terminal device. The terminal device receives signaling sent by the ephemeris information network element, where the signaling includes the ephemeris information of the first satellite base stations.

In a possible implementation, that the terminal device determines, based on the ephemeris information, a destination satellite base station to which the terminal device needs to hand over includes: The terminal device calculates a second time based on the ephemeris information, where the second time is a start time of covering the terminal device by satellite base stations covering the terminal device. The terminal device determines second satellite base stations based on the second time, where the second satellite base stations are satellite base stations that are to cover the terminal device after a current moment. The terminal device calculates distances between the second satellite base stations and the terminal device based on ephemeris information of the second satellite base stations and the position information of the terminal device, and determines a nearest satellite base station of the second satellite base stations as the destination satellite base station.

In a possible implementation, that the terminal device determines, based on the determined destination satellite base station, a first time at which the terminal device is to hand over to the destination satellite base station includes: The terminal device calculates a movement speed of the destination satellite base station based on ephemeris information of the destination satellite base station, and calculates the first time based on the movement speed of the destination satellite base station, a movement speed of the terminal device, and a specified handover advance.

In a possible implementation, that a terminal device obtains ephemeris information of first satellite base stations includes: The terminal device receives a broadcast message, where the broadcast message includes identification information of the first satellite base stations and identification information, coverage times, and longitude and latitude information that are of cells included in the first satellite base stations, and in the coverage times, the cells included in the first satellite base stations cover positions represented by the longitude and latitude information.

In a possible implementation, that the terminal device determines, based on the ephemeris information, a destination satellite base station to which the terminal device needs to hand over includes: The terminal device determines, based on the identification information of the first satellite base stations and the identification information, the coverage times, and the longitude and latitude information that are of the cells included in the first satellite base stations, a cell that is of the cells included in the first satellite base stations and that first covers the terminal device; and determines, as the destination satellite base station, a base station to which the cell that first covers the terminal device belongs.

In a possible implementation, that the terminal device determines, based on the determined destination satellite base station, a first time at which the terminal device is to hand over to the destination satellite base station includes: The terminal device calculates the first time based on coverage time of the destination satellite base station and a specified handover advance.

In a possible implementation, the broadcast message is sent by one of the first satellite base stations, or the broadcast message is sent by each of the first satellite base stations.

According to a second aspect, this application provides a handover apparatus in satellite communications, including: a transceiver unit, configured to obtain ephemeris information of first satellite base stations, where the first satellite base stations are satellite base stations that cover a terminal device; and a processing unit, configured to: determine, based on the ephemeris information, a destination satellite base station to which the terminal device needs to hand over; determine, based on the determined destination satellite base station, a first time at which the terminal device is to hand over to the destination satellite base station; and hand over, based on the determined first time, to a destination cell served by the destination satellite base station.

In this embodiment, the terminal device determines the destination satellite base station based on position information of satellite base stations, and determines a time to hand over to the destination satellite base station. The terminal device hands over to the destination cell served by the destination satellite base station when the time arrives. A satellite orbits periodically, so that handover information determined by the terminal device also assumes periodicity. In addition, the terminal device may not calculate a handover time in a disconnected state. Therefore, the terminal device does not need to frequently measure channel quality and report a measurement result. This reduces power consumption of the terminal device, saves air interface resources, and further avoids a signaling storm caused because a large quantity of terminal devices report measurement information at the same moment. Moreover, there is a relatively high probability that link handover decided and led by a network side fails, because a satellite and a terminal operate on the move. However, a handover success rate can be increased when the destination satellite base station and the handover time are selected by the terminal device.

In a possible implementation, the transceiver unit is specifically configured to: send an ephemeris information request to an ephemeris information network element, where the ephemeris information request includes position information of the terminal device; and receive signaling sent by the ephemeris information network element, where the signaling includes the ephemeris information of the first satellite base stations.

In a possible implementation, the processing unit is specifically configured to: calculate a second time based on the ephemeris information, where the second time is a start time of covering the terminal device by satellite base stations covering the terminal device; determine second satellite base stations based on the second time, where the second satellite base stations are satellite base stations that are to cover the terminal device after a current moment; and calculate distances between the second satellite base stations and the terminal device based on ephemeris information of the second satellite base stations and the position information of the terminal device, and determine a nearest satellite base station of the second satellite base stations as the destination satellite base station.

In a possible implementation, the processing unit is specifically configured to calculate a movement speed of the destination satellite base station based on ephemeris information of the destination satellite base station, and calculate the first time based on the movement speed of the destination satellite base station, a movement speed of the terminal device, and a specified handover advance.

In a possible implementation, the transceiver unit is specifically configured to receive a broadcast message, where the broadcast message includes identification information of the first satellite base stations and identification information, coverage times, and longitude and latitude information that are of cells included in the first satellite base stations, and in the coverage times, the cells included in the first satellite base stations cover positions represented by the longitude and latitude information.

In a possible implementation, the processing unit is specifically configured to: determine, based on the identification information of the first satellite base stations and the identification information, the coverage times, and the longitude and latitude information that are of the cells included in the first satellite base stations, a cell that is of the cells included in the first satellite base stations and that first covers the terminal device; and determine, as the destination satellite base station, a base station to which the cell that first covers the terminal device belongs.

In a possible implementation, the processing unit is specifically configured to calculate the first time based on coverage time of the destination satellite base station and a specified handover advance.

In a possible implementation, the broadcast message is sent by one of the first satellite base stations, or the broadcast message is sent by each of the first satellite base stations.

According to a third aspect, this application provides a terminal device, including: one or more processors; and a memory, configured to store one or more programs, where when the one or more programs are executed by the one or more processors, the one or more processors are enabled to implement the method according to any one of the first aspect or the possible implementations of the first aspect.

According to a fourth aspect, this application provides a computer-readable storage medium, including a computer program, where when the computer program is executed on a computer, the computer is enabled to perform the method according to any one of the first aspect or the possible implementations of the first aspect.

According to a fifth aspect, this application provides a computer program, where when the computer program is executed by a computer, the computer program is configured to perform the method according to any one of the first aspect or the possible implementations of the first aspect.

According to a sixth aspect, this application provides a chip, including a processor and a memory, where the memory is configured to store a computer program, and the processor is configured to invoke and run the computer program stored in the memory, to perform the method according to any one of the first aspect or the possible implementations of the first aspect.

DESCRIPTION OF EMBODIMENTS

To make the objectives, technical solutions, and advantages of this application clearer, the following clearly and completely describes the technical solutions in this application with reference to the accompanying drawings in this application. It is clear that the described embodiments are merely a part rather than all of this application. All other embodiments obtained by a person of ordinary skill in the art based on the embodiments of this application without creative efforts shall fall within the protection scope of this application.

Figure 1:
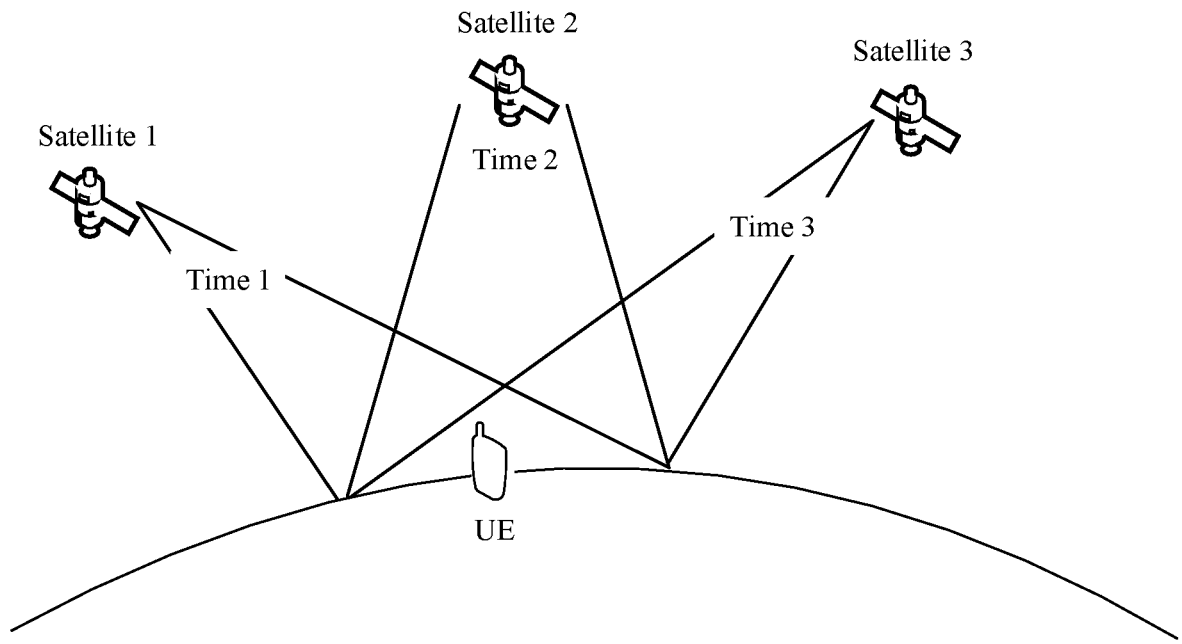
FIG. 1 is a schematic diagram of handover of a terminal device caused by movement of satellites in an LEO.

FIG. 1 is a schematic diagram of handover of a terminal device caused by movement of satellites in an LEO. As shown in FIG. 1, due to movement of satellites, a position at which the terminal device is located is covered by a satellite 1 at a time 1. At a time 2, the satellite 1 has moved to another place, and the position at which the terminal device is located is covered by a satellite 2. At a time 3, the satellite 2 has also moved to another place, and the position at which the terminal device is located is covered by a satellite 3. Therefore, an access service is provided to the terminal device by different satellites at different times. In this process, the terminal device needs to hand over between cells of different satellites.

Figure 2:
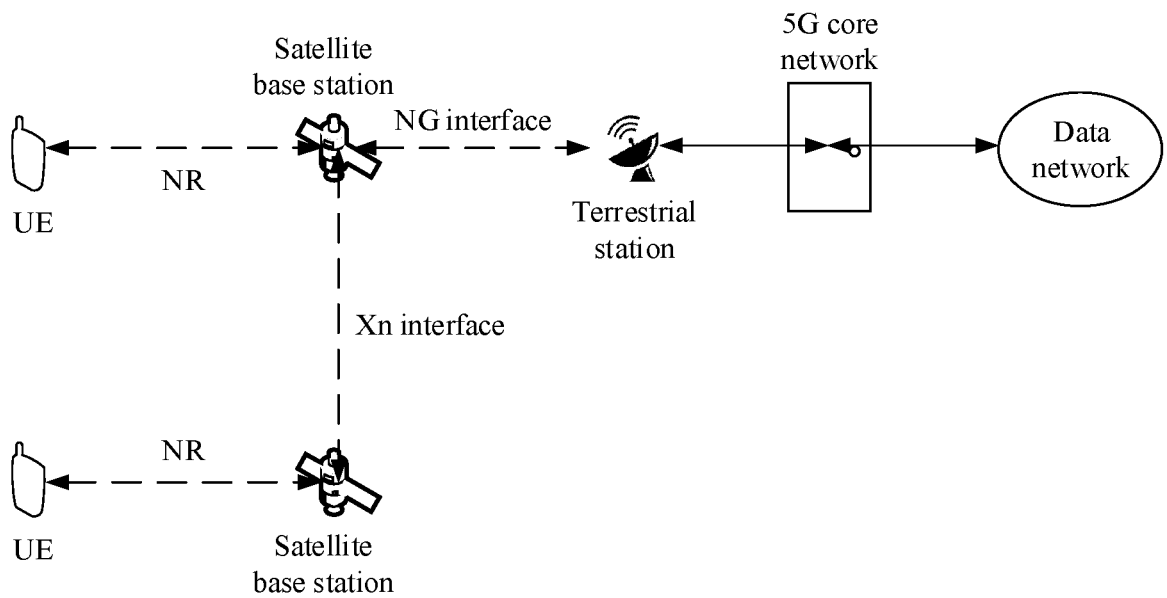
FIG. 2 is a schematic diagram of a satellite communications scenario according to this application.

FIG. 2 is a schematic diagram of a satellite communications scenario according to this application. As shown in FIG. 2, this application pertains to the field of satellite communications. A terminal device located on the ground accesses a network through new radio (NR). A base station is deployed on a satellite and is connected to a terrestrial station on the ground and a 5G core network through a radio link. A radio link also exists between satellite base stations, to complete signaling interworking and user data transmission between the base stations. The terminal device is a mobile device that supports NR, including a mobile phone, a tablet computer, and the like. The terminal device may access a satellite base station through NR and initiate services such as calls and Internet surfing. The satellite base station mainly provides a radio access service, schedules a radio resource for the terminal device, and supports a reliable radio transport protocol, data encryption protocol, and the like. The 5G core network is mainly responsible for access control, mobility management, session management, user security authentication, charging, and other services of the terminal device. The terrestrial station is mainly responsible for forwarding signaling and service data between the satellite base station and the 5G core network. NR is a radio link between the terminal device and the satellite base station. An Xn interface is an interface between satellite base stations that is mainly configured for signaling interworking for handover and the like. An NG interface is an interface between the satellite base station and the 5G core network, and mainly exchanges signaling of the 5G core network and service data of the terminal device.

The following describes a handover method in satellite communications provided in this application by using the scenario shown in FIG. 2 as an example.

Figure 3:
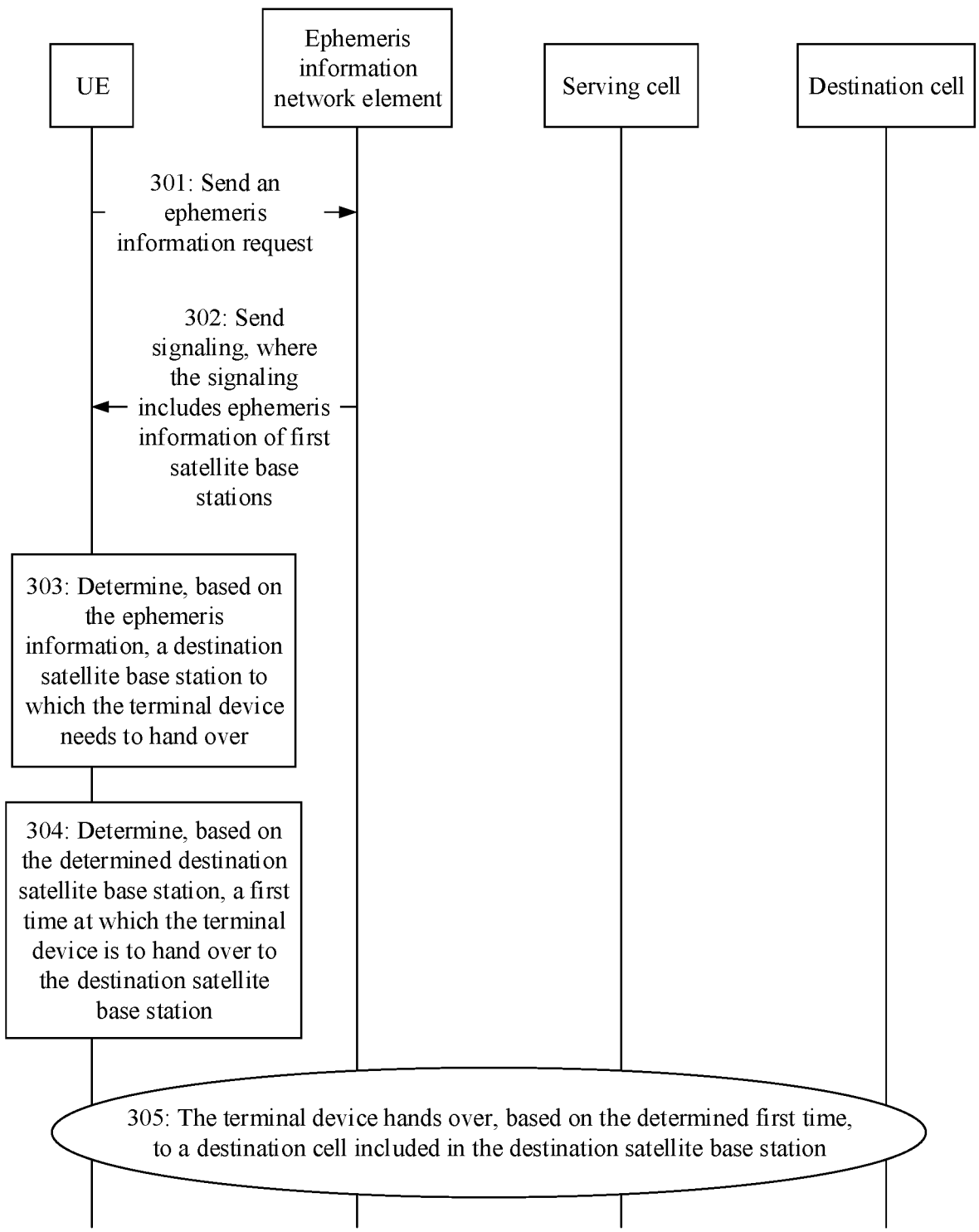
FIG. 3 is a flowchart of Embodiment 1 of a handover method in satellite communications according to this application.

FIG. 3 is a flowchart of Embodiment 1 of a handover method in satellite communications according to this application. As shown in FIG. 3, the method in this embodiment may be performed by a terminal device. The method may include the following steps.

Step 301: The terminal device sends an ephemeris information request to an ephemeris information network element.

The ephemeris information request includes position information of the terminal device. The ephemeris information network element is configured to collect ephemeris information of all satellite base stations. The ephemeris information network element may be a network-side device independent of a satellite base station and a 5G core network, or may be disposed in a 5G core network (as shown in FIG. 2).

Step 302: The ephemeris information network element sends signaling to the terminal device, where the signaling includes ephemeris information of first satellite base stations.

The first satellite base stations are satellite base stations that cover the terminal device. Ephemeris information includes an angle of inclination of an orbital plane of the satellite, a right ascension of an ascending node, a semi-major axis of an orbital ellipse, an eccentricity of the orbital ellipse, an angular distance of a perigee, a moment at which the satellite passes the perigee, and the like.

Step 303: The terminal device determines, based on the ephemeris information, a destination satellite base station to which the terminal device needs to hand over.

If the terminal device finds that a signal of a serving base station has weakened, for example, a bit error rate of the signal received from the serving base station is greater than a specified threshold, it indicates that the serving base station is now moving away from the terminal, and signal strength is weakening. If handover is not performed in a timely manner, the terminal device may go offline. In this case, the terminal device may calculate a second time based on the previously obtained ephemeris information. The second time is a start time of covering the terminal device by satellite base stations covering the terminal device. Then, the terminal device determines second satellite base stations based on the second time. The second satellite base stations are satellite base stations that are to cover the terminal device after a current moment. Finally, the terminal device calculates distances between the second satellite base stations and the terminal device based on ephemeris information of the second satellite base stations and the position information of the terminal device, and determines a nearest satellite base station of the second satellite base stations as the destination satellite base station.

Based on the ephemeris information obtained in step 302, the terminal device may obtain a movement track of each satellite base station that can cover the terminal device and start times of covering the terminal device by the satellite base stations, and may even determine satellite base stations that are to move away from the terminal device and satellite base stations that are to move close to the terminal device. The terminal device may determine M second satellite base stations from N first satellite base stations based on the ephemeris information. A satellite base station has a fixed movement track. Therefore, depending on movement directions, there are satellite base stations moving toward the terminal device and satellite base stations moving away from the terminal device. The terminal device first rules out the satellite base stations moving away from the terminal device and keeps only the satellite base stations moving toward the terminal device, that is, satellite base stations that are to cover the terminal device after the current moment. The terminal device then calculates distances between the M second satellite base stations and the terminal device based on ephemeris information of the M second satellite base stations and the position information of the terminal device, and determines a nearest satellite base station of the M second satellite base stations as the destination satellite base station. Assuming that a position of the terminal device is P0, P0 may be obtained by using a positioning apparatus. Positions of the M second satellite base stations are respectively P1, P2, . . . , and PM. P1, P2, . . . , and PM may be obtained based on the ephemeris information of the second satellite base stations. The terminal device separately calculates distances D1, D2, D3, . . . , and DM from the second satellite base stations, and selects second satellite base stations with a shortest distance as the destination satellite base station (target gNB) to hand over to.

Step 304: The terminal device determines, based on the determined destination satellite base station, a first time at which the terminal device is to hand over to the destination satellite base station.

In this application, the terminal device calculates a movement speed of the destination satellite base station based on ephemeris information of the destination satellite base station, and calculates the first time based on the movement speed of the destination satellite base station, a movement speed of the terminal device, and a specified handover advance.

A round-trip transmission delay occurs when a signal is transmitted between the terminal device and a satellite base station. Therefore, when calculating a handover time, the terminal device further needs to consider the signal transmission delay, that is, to subtract the handover advance from an actual handover time. The handover advance may be specified by referring to factors such as a transmission distance, a transmission speed, and the signal transmission delay.

Step 305: The terminal device hands over, based on the determined first time, to a destination cell served by the destination satellite base station.

In this embodiment, the terminal device receives a synchronization signal when the first time arrives, and determines the destination cell based on the synchronization signal. A cell served by the destination satellite base station sends a broadcast message and a synchronization signal externally. After receiving the synchronization signal, the terminal device considers that a condition for accessing the cell is met, and then confirms that the cell is the destination cell.

The terminal device may directly send a handover request to a serving cell. The handover request includes identification information of the destination satellite base station and identification information of the destination cell. The handover request sent by the terminal device to the serving cell may be implemented in two manners: One is to add a handover request message, where the handover request message carries the identification information of the destination satellite base station and the identification information of the destination cell. The other is to add a new trigger event, for example, Ax, to an existing measurement event. The terminal device adds the identification information of the destination satellite base station and the identification information of the destination cell to the measurement event.

In this embodiment, the terminal device determines the destination satellite base station based on position information of satellite base stations, and determines a time to hand over to the destination satellite base station. The terminal device hands over to the destination cell served by the destination satellite base station when the time arrives. A satellite orbits periodically, so that handover information determined by the terminal device also assumes periodicity. In addition, the terminal device may not calculate a handover time in a disconnected state. Therefore, the terminal device does not need to frequently measure channel quality and report a measurement result. This reduces power consumption of the terminal device, saves air interface resources, and further avoids a signaling storm caused because a large quantity of terminal devices report measurement information at the same moment. Moreover, there is a relatively high probability that link handover decided and led by a network side fails, because a satellite and a terminal operate on the move. However, a handover success rate can be increased when the destination satellite base station and the handover time are selected by the terminal device.

Figure 4:
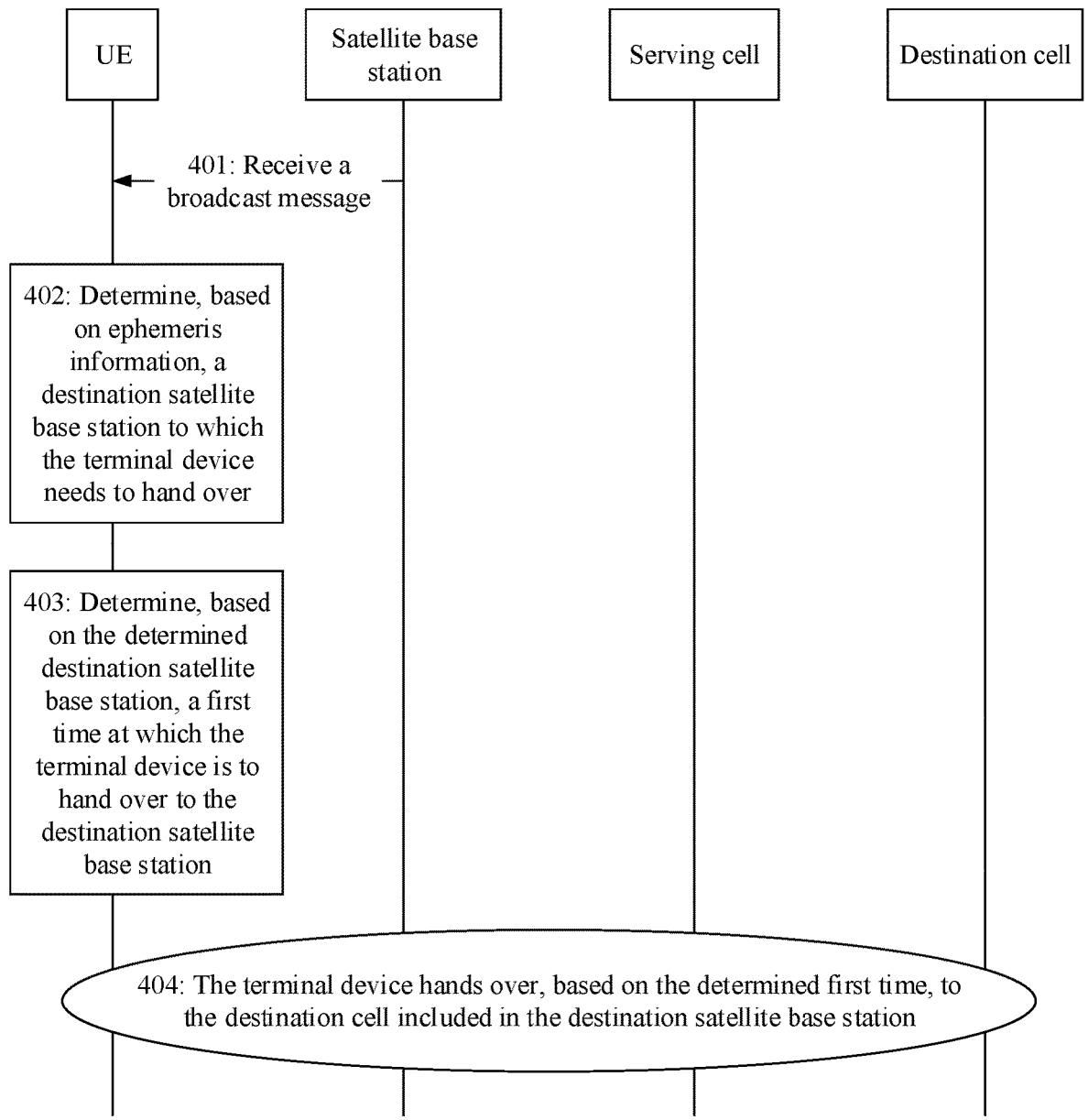
FIG. 4 is a flowchart of Embodiment 2 of a handover method in satellite communications according to this application.

FIG. 4 is a flowchart of Embodiment 2 of a handover method in satellite communications according to this application. As shown in FIG. 4, the method in this embodiment may include the following steps.

Step 401: A terminal device receives a broadcast message.

The broadcast message may be sent by one of satellite base stations that cover the terminal device, or may be sent by each of the satellite base stations that cover the terminal device. A satellite base station may obtain its ephemeris information from a core network, where the ephemeris information includes an angle of inclination of an orbital plane of the satellite, a right ascension of an ascending node, a semi-major axis of an orbital ellipse, an eccentricity of the orbital ellipse, an angular distance of a perigee, a moment at which the satellite passes the perigee, and the like; and obtains ephemeris information of a neighboring satellite base station based on communication with the neighboring satellite base station. Therefore, the satellite base station can calculate, based on the ephemeris information, a time of covering an area. The satellite base station may send a calculation result to the terminal in a form of a broadcast message.

The broadcast message includes identification information of first satellite base stations that cover the terminal device and identification information, coverage times, and longitude and latitude information that are of cells included in the first satellite base stations. In the coverage times, the cells included in the first satellite base stations cover positions represented by the longitude and latitude information. For example, the broadcast message may be represented in a form shown in Table 1.

TABLE 1

| Identification information of a satellite base station | Identification information of a cell | Coverage time | Longitude | Latitude |
| --- | --- | --- | --- | --- |
| gNB ID 1 | Cell ID 1 | 9:00-9:05 | 23°26'22" W | 23°26'22" S |
| gNB ID 2 | Cell ID 2 | 9:05-9:10 | 23°26'22" W | 23°26'22" S |
| gNB ID 3 | Cell ID 3 | 9:10-9:15 | 23°26'22" W | 23°26'22" S |

Step 402: The terminal device determines, based on ephemeris information, a destination satellite base station to which the terminal device needs to hand over.

The terminal device determines, based on the identification information of the first satellite base stations and the identification information, the coverage times, and the longitude and latitude information that are of the cells included in the first satellite base stations, a cell that is of the cells included in the first satellite base stations and that first covers the terminal device; and determines, as the destination satellite base station, a base station to which the cell that first covers the terminal device belongs.

It can be learned from Table 1 that there are three satellite base stations (which are 5G base stations (next Generation Node B, gNB)) in total that cover in turn a position represented by a longitude of 23° 26'22" W of and a latitude of 23° 26'22" S. The terminal device may obtain its position by using a positioning apparatus, for example, a global positioning system (GPS). Based on information in Table 1, the terminal device can know that the position represented by the longitude of 23° 26'22" W and the latitude of 23° 26'22" S is its own position, thereby determining coverage times of covering the position at which the terminal device is located by the three cells in Table 1. The terminal device determines, as a destination cell, a cell that first covers the position at which the terminal device is located of the cells, for example, Cell ID 1. A base station to which the destination cell belongs is the destination satellite base station.

Step 403: The terminal device determines, based on the determined destination satellite base station, a first time at which the terminal device is to hand over to the destination satellite base station.

The terminal device calculates the first time based on coverage time of the destination satellite base station and a specified handover advance. A round-trip transmission delay occurs when a signal is transmitted between the terminal device and a satellite base station. Therefore, when calculating a handover time, the terminal device further needs to consider the signal transmission delay, that is, to subtract the handover advance from an actual handover time. The handover advance may be specified by referring to factors such as a transmission distance, a transmission speed, and the signal transmission delay.

Step 404: The terminal device hands over, based on the determined first time, to the destination cell served by the destination satellite base station.

The terminal device sends a handover request to a serving cell. The handover request includes identification information of the destination satellite base station and identification information of the destination cell. The handover request sent by the terminal device to the serving cell may be implemented in two manners: One is to add a handover request message, where the handover request message carries the identification information of the destination satellite base station and the identification information of the destination cell. The other is to add a new trigger event, for example, Ax, to an existing measurement event. The terminal device adds the identification information of the destination satellite base station and the identification information of the destination cell to the measurement event.

In this embodiment, the terminal device determines the destination satellite base station based on position information of satellite base stations, and determines a time to hand over to the destination satellite base station. The terminal device hands over to the destination cell served by the destination satellite base station when the time arrives. A satellite orbits periodically, so that handover information determined by the terminal device also assumes periodicity. In addition, the terminal device may not calculate a handover time in a disconnected state. Therefore, the terminal device does not need to frequently measure channel quality and report a measurement result. This reduces power consumption of the terminal device, saves air interface resources, and further avoids a signaling storm caused because a large quantity of terminal devices report measurement information at the same moment. Moreover, there is a relatively high probability that link handover decided and led by a network side fails, because a satellite and a terminal operate on the move. However, a handover success rate can be increased when the destination satellite base station and the handover time are selected by the terminal device.

After receiving the handover request, the serving cell learns of the destination satellite base station and the destination cell through parsing, and sends the handover request to the destination cell through an Xn interface, thereby starting a handover process stipulated in 3rd generation partnership project (3GPP).

Figure 5:
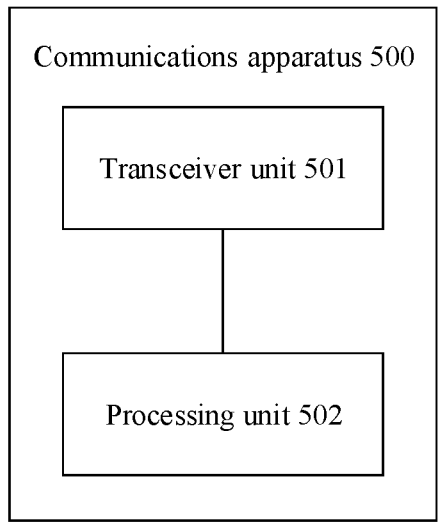
FIG. 5 is a schematic block diagram of a communications apparatus 500 according to this application.

FIG. 5 is a schematic block diagram of a communications apparatus 500 according to this application. The communications apparatus 500 includes a processing unit 502 and a transceiver unit 501.

In an embodiment, the communications apparatus 500 has a handover function of the terminal device in satellite communications in the method embodiments. For example, the communications apparatus 500 may completely correspond to the terminal device in the embodiment of FIG. 3 or FIG. 4. In this case, the units of the communications apparatus 500 are configured to perform the following operations and/or processing.

The transceiver unit 501 is configured to obtain ephemeris information of first satellite base stations, where the first satellite base stations are satellite base stations that cover the terminal device.

The processing unit 502 is configured to determine, based on the ephemeris information, a destination satellite base station to which the terminal device needs to hand over; determine, based on the determined destination satellite base station, a first time at which the terminal device is to hand over to the destination satellite base station; and hand over, based on the determined first time, to a destination cell served by the destination satellite base station.

In a possible implementation, the transceiver unit 501 is specifically configured to: send an ephemeris information request to an ephemeris information network element, where the ephemeris information request includes position information of the terminal device; and receive signaling sent by the ephemeris information network element, where the signaling includes the ephemeris information of the first satellite base stations.

In a possible implementation, the processing unit 502 is specifically configured to: calculate a second time based on the ephemeris information, where the second time is a start time of covering the terminal device by satellite base stations covering the terminal device; determine second satellite base stations based on the second time, where the second satellite base stations are satellite base stations that are to cover the terminal device after a current moment; and calculate distances between the second satellite base stations and the terminal device based on ephemeris information of the second satellite base stations and the position information of the terminal device, and determine a nearest satellite base station of the second satellite base stations as the destination satellite base station.

In a possible implementation, the processing unit 502 is specifically configured to calculate a movement speed of the destination satellite base station based on ephemeris information of the destination satellite base station, and calculate the first time based on the movement speed of the destination satellite base station, a movement speed of the terminal device, and a specified handover advance.

In a possible implementation, the transceiver unit 501 is specifically configured to receive a broadcast message, where the broadcast message includes identification information of the first satellite base stations and identification information, coverage times, and longitude and latitude information that are of cells included in the first satellite base stations, and in the coverage times, the cells included in the first satellite base stations cover positions represented by the longitude and latitude information.

In a possible implementation, the processing unit 502 is specifically configured to: determine, by the terminal device based on the identification information of the first satellite base stations and the identification information, the coverage times, and the longitude and latitude information that are of the cells included in the first satellite base stations, a cell that is of the cells included in the first satellite base stations and that first covers the terminal device; and determine, as the destination satellite base station, a base station to which the cell that first covers the terminal device belongs.

In a possible implementation, the processing unit 502 is specifically configured to calculate the first time based on coverage time of the destination satellite base station and a specified handover advance.

In a possible implementation, the broadcast message is sent by one of the first satellite base stations, or the broadcast message is sent by each of the first satellite base stations.

Optionally, the communications apparatus 500 may also have other functions in the method embodiments. For similar description, refer to the foregoing descriptions of the method embodiments. To avoid repetition, details are not described herein again.

Optionally, the processing unit 502 may be a processor, and the transceiver unit 501 may be a transceiver. The transceiver includes a receiver and a transmitter, and has both sending and receiving functions.

Optionally, the processing unit 502 may be a processing apparatus. Some or all functions of the processing apparatus may be implemented by using software.

In a possible implementation, some or all functions of the processing apparatus are implemented by using software. In this case, the processing apparatus may include a memory and a processor. The memory is configured to store a computer program. The processor reads and executes the computer program stored in the memory, to perform steps implemented by the terminal device in a satellite base station in the method embodiments.

Optionally, in a possible implementation, the processing apparatus includes a processor. A memory configured to store a computer program is located outside the processing apparatus. The processor is connected to the memory by using a circuit/an electric wire, to read and execute the computer program stored in the memory.

In a possible implementation, all functions of the processing apparatus may be implemented by using hardware. In this case, the processing apparatus may include an input interface circuit, a logical circuit, and an output interface circuit. The input interface circuit is configured to obtain ephemeris information of first satellite base stations, where the first satellite base stations are satellite base stations that cover the terminal device. The logical circuit is configured to: determine, based on the ephemeris information, a destination satellite base station to which the terminal device needs to hand over; determine, based on the determined destination satellite base station, a first time at which the terminal device is to hand over to the destination satellite base station; and hand over, based on the determined first time, to a destination cell served by the destination satellite base station.

Optionally, the output interface circuit outputs the ephemeris information of the satellite base station to the memory, to be stored in the memory.

In another embodiment, the communications apparatus 500 may be a chip. In this case, the transceiver unit 501 may specifically be a communications interface or a transceiver circuit.

Figure 6:
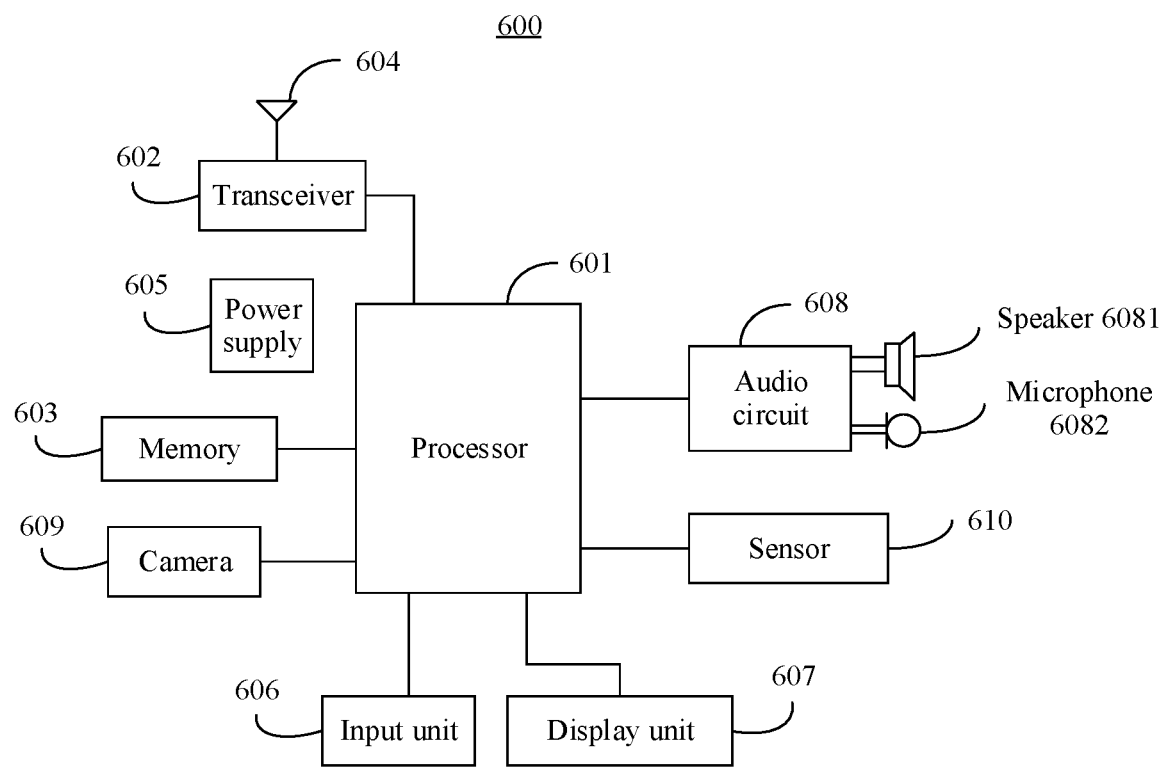
FIG. 6 is a schematic structural diagram of a terminal device 600 according to this application.

FIG. 6 is a schematic structural diagram of a terminal device 600 according to this application. As shown in FIG. 6, the terminal device 600 includes a processor 601 and a transceiver 602.

Optionally, the terminal device 600 further includes a memory 603. The processor 601, the transceiver 602, and the memory 603 may communicate with each other through an internal connection path, to transfer a control signal and/or a data signal.

The memory 603 is configured to store a computer program. The processor 601 is configured to execute the computer program stored in the memory 603, thereby implementing the functions of the communications apparatus 500 in the foregoing apparatus embodiment.

Specifically, the processor 601 may be configured to perform the operation and/or processing performed by the processing unit 502 described in the apparatus embodiment shown in FIG. 5. The transceiver 602 is configured to perform the operation and/or processing performed by the transceiver unit 501.

For example, the transceiver 602 obtains ephemeris information of first satellite base stations, where the first satellite base stations are satellite base stations that cover the terminal device. For another example, the processor 601 determines, based on the ephemeris information, a destination satellite base station to which the terminal device needs to hand over; determine, based on the determined destination satellite base station, a first time at which the terminal device is to hand over to the destination satellite base station; and hand over, based on the determined first time, to a destination cell served by the destination satellite base station.

Optionally, the memory 603 may be integrated into the processor 601 or independent of the processor 601.

Optionally, the terminal device 600 may further include an antenna 604, configured to transmit a signal output by the transceiver 602. Alternatively, the transceiver 602 receives a signal through the antenna.

Optionally, the terminal device 600 may further include a power supply 605, configured to supply power to various components or circuits in the terminal device.

In addition, to make functions of the terminal device more complete, the terminal device 600 may further include one or more of an input unit 606, a display unit 607 (which may also be considered as an output unit), an audio circuit 608, a camera 609, a sensor 610, and the like. The audio circuit may further include a speaker 6081, a microphone 6082, and the like. Details are not described herein.

In addition, the application further provides a communications system, including the satellite base stations and the terminal device in the method embodiments.

This application further provides a computer-readable storage medium. The computer-readable storage medium stores a computer program. When the computer program is executed by a computer, the computer is enabled to perform the steps and/or processing performed by the satellite base station in any one of the foregoing method embodiments.

This application further provides a computer program product. The computer program product includes computer program code. When the computer program code is run on a computer, the computer is enabled to perform the steps and/or processing performed by the satellite base station in any one of the foregoing method embodiments.

This application further provides a chip. The chip includes a processor. A memory configured to store a computer program is disposed independent of the chip. The processor is configured to execute the computer program stored in the memory, to perform the steps and/or processing performed by the satellite base station in any one of the foregoing method embodiments.

Further, the chip may include a memory and a communications interface. The communications interface may be an input/output interface, a pin, an input/output circuit, or the like.

This application further provides a computer-readable storage medium. The computer-readable storage medium stores a computer program. When the computer program is executed by a computer, the computer is enabled to perform the operations and/or processing performed by the terminal device in any one of the foregoing method embodiments.

This application further provides a computer program product. The computer program product includes computer program code. When the computer program code is run on a computer, the computer is enabled to perform the steps and/or processing performed by the terminal device in any one of the foregoing method embodiments.

This application further provides a chip. The chip includes a processor. A memory configured to store a computer program is disposed independent of the chip. The processor is configured to execute the computer program stored in the memory, to perform the operations and/or processing performed by the terminal device in any one of the foregoing method embodiments.

Further, the chip may include a memory and a communications interface. The communications interface may be an input/output interface, a pin, an input/output circuit, or the like.

Figure 7:
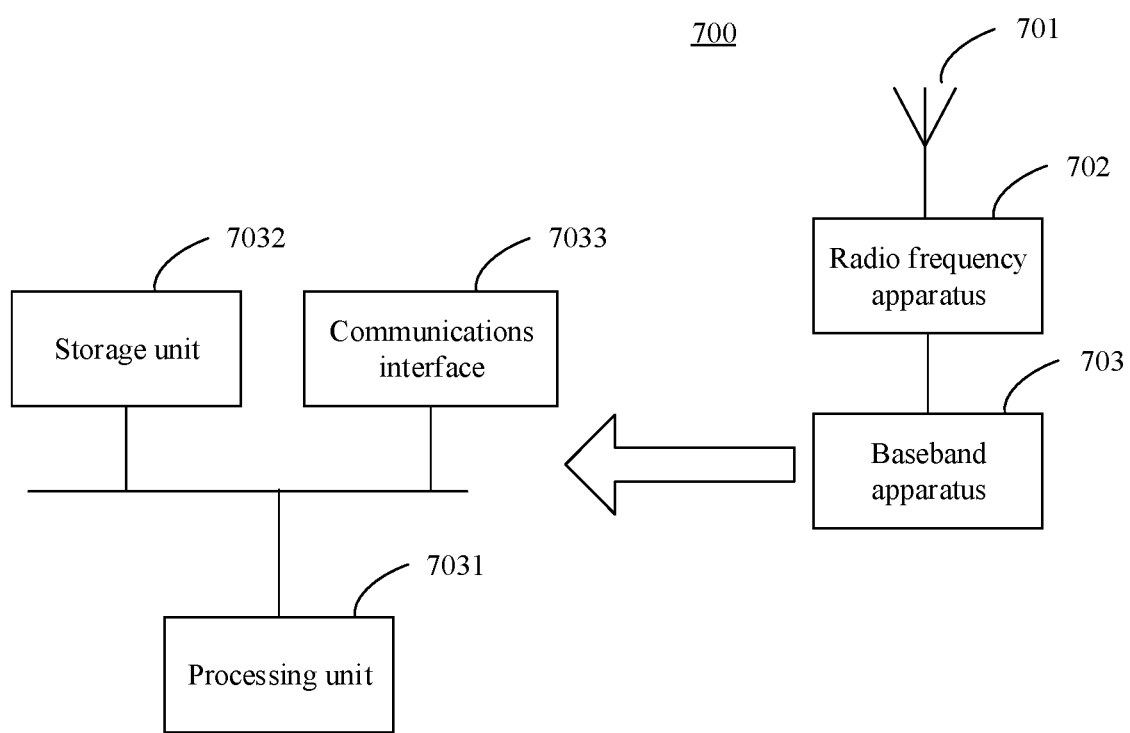
FIG. 7 is a schematic structural diagram of a network device 700 according to this application.

FIG. 7 is a schematic structural diagram of a network device 700 according to this application. The network device 700 may correspond to the satellite base station in the method embodiments. As shown in FIG. 7, the network device 700 includes an antenna 701, a radio frequency apparatus 702, and a baseband apparatus 703. The antenna 701 is connected to the radio frequency apparatus 702. In an uplink direction, the radio frequency apparatus 702 receives a signal from a terminal device through the antenna 701, and sends the received signal to the baseband apparatus 703 for processing. In a downlink direction, the baseband apparatus 703 generates a signal that needs to be sent to the terminal device and sends the generated signal to the radio frequency apparatus 702. The radio frequency apparatus 702 transmits the signal through the antenna 701.

The baseband apparatus 703 may include one or more processing units 7031. The processing unit 7031 may specifically be a processor.

In addition, the baseband apparatus 703 may further include one or more storage units 7032 and one or more communications interfaces 7033. The storage unit 7032 is configured to store a computer program and/or data. The communications interface 7033 is configured to exchange information with the radio frequency apparatus 702. The storage unit 7032 may specifically be a memory. The communications interface 7033 may be an input/output interface or a transceiver circuit.

Optionally, the storage unit 7032 may be a storage unit located on a same chip as the processing unit 7031, that is, an on-chip storage unit; or may be a storage unit located on a different chip from the processing unit 7031, that is, an off-chip storage unit. This is not limited in this application.

In FIG. 7, the baseband apparatus 703 may perform the operations and/or processing performed by the processing unit 502 in the apparatus embodiment shown in FIG. 5. The radio frequency apparatus 702 may perform the operations and/or processing performed by the transceiver unit 501 in the apparatus embodiment shown in FIG. 5.

In an embodiment, the processing unit 502 in the communications apparatus 500 shown in FIG. 5 may be the baseband apparatus 703 shown in FIG. 7, and the transceiver unit 501 may be the radio frequency apparatus 702.

The processor described in foregoing embodiments may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The general purpose processor may be a microprocessor, or the processor may be any conventional processor or the like. Steps of the methods disclosed in the embodiments of this application may be directly executed and accomplished by using a hardware encoding processor, or may be executed and accomplished by using a combination of hardware and software modules in the encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory mentioned in the foregoing embodiments may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in the form of a software product. The software product is stored in a storage medium and includes several instructions for instructing a computer device (a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method in satellite communications that uses a satellite constellation in a non-geosynchronous satellite orbit-based communications system, the method comprising:
    obtaining, by a terminal device, ephemeris information of first satellite base stations, wherein the first satellite base stations are satellite base stations that cover the terminal device, wherein the ephemeris information, for a satellite base station of the first satellite base stations, includes:
        an angle of inclination of an orbital plane of the satellite,
        a semi-major axis of an orbital ellipse,
        an eccentricity of the orbital ellipse,
        a right ascension of an ascending node, and
        an angular distance of a perigee;
    determining, by the terminal device based on the ephemeris information, a destination satellite base station to which the terminal device needs to hand over;
    determining, by the terminal device based on the determined destination satellite base station, a first time at which the terminal device is to hand over to the destination satellite base station; and
    handing over, by the terminal device based on the determined first time, to a destination cell served by the destination satellite base station.

2. The method according to claim 1, wherein obtaining, by the terminal device, the ephemeris information of the first satellite base stations comprises:
    sending, by the terminal device, an ephemeris information request to an ephemeris information network element, wherein the ephemeris information request comprises position information of the terminal device; and receiving, by the terminal device, signaling sent by the ephemeris information network element, wherein the signaling comprises the ephemeris information of the first satellite base stations.

3. The method according to claim 2, wherein determining, by the terminal device based on the ephemeris information, the destination satellite base station to which the terminal device needs to hand over comprises:
determining, by the terminal device, a second time based on the ephemeris information, wherein the second time is a start time of covering the terminal device by satellite base stations covering the terminal device;
determining, by the terminal device, second satellite base stations based on the second time, wherein the second satellite base stations are satellite base stations that are to cover the terminal device after a current moment; and
determining, by the terminal device, distances between the second satellite base stations and the terminal device based on ephemeris information of the second satellite base stations and the position information of the terminal device, and determining a nearest satellite base station of the second satellite base stations as the destination satellite base station.

4. The method according to claim 3, wherein determining, by the terminal device based on the determined destination satellite base station, the first time at which the terminal device is to hand over to the destination satellite base station comprises:
determining, by the terminal device, a movement speed of the destination satellite base station based on ephemeris information of the destination satellite base station, and determining the first time based on the movement speed of the destination satellite base station, a movement speed of the terminal device, and a specified handover advance.

5. The method according to claim 1, wherein obtaining, by the terminal device, the ephemeris information of the first satellite base stations comprises:
receiving, by the terminal device, a broadcast message, wherein the broadcast message comprises at least one of the following parameters:
identification information of the first satellite base stations and identification information, coverage times, and longitude and latitude information that are of cells comprised in the first satellite base stations, and in the coverage times, the cells comprised in the first satellite base stations cover positions represented by the longitude and latitude information.

6. The method according to claim 5, wherein determining, by the terminal device based on the ephemeris information, the destination satellite base station to which the terminal device needs to hand over comprises:
determining, by the terminal device based on the identification information of the first satellite base stations and the identification information, the coverage times, and the longitude and latitude information that are of the cells comprised in the first satellite base stations, a cell that is of the cells comprised in the first satellite base stations and that first covers the terminal device; and
determining, as the destination satellite base station, a base station to which the cell that first covers the terminal device belongs.

7. The method according to claim 6, wherein determining, by the terminal device based on the determined destination satellite base station, the first time at which the terminal device is to hand over to the destination satellite base station comprises:
determining, by the terminal device, the first time based on coverage time of the destination satellite base station and a specified handover advance.

8. The method according to claim 5, wherein the broadcast message is sent by only one of the first satellite base stations, or wherein the broadcast message is sent by each of the first satellite base stations.

9. The method according to claim 1, wherein a broadcast message is sent by only one of the first satellite base stations, or the broadcast message is sent by each of the first satellite base stations.

10. A communication apparatus configured to operate to carry out a handover method in satellite communications that uses a satellite constellation in a non-geosynchronous satellite orbit-based communications system, the communications apparatus comprising:
one or more processors; and
a memory configured to store one or more programs, wherein when the one or more programs are executed by the one or more processors, the one or more processors are enabled to carry out a method comprising:
obtaining ephemeris information of first satellite base stations, wherein the first satellite base stations are satellite base stations that cover a terminal device, wherein the ephemeris information, for a satellite base station of the first satellite base stations, includes:
an angle of inclination of an orbital plane of the satellite,
a semi-major axis of an orbital ellipse,
an eccentricity of the orbital ellipse,
a right ascension of an ascending node, and
an angular distance of a perigee;
determining, based on the ephemeris information, a destination satellite base station to which the terminal device needs to hand over;
determining, based on the determined destination satellite base station, a first time at which the terminal device is to hand over to the destination satellite base station; and
handing over, based on the determined first time, to a destination cell served by the destination satellite base station.

11. The apparatus according to claim 10, wherein the one or more processors are enabled to:
send an ephemeris information request to an ephemeris information network element, wherein the ephemeris information request comprises position information of the terminal device; and
receive signaling sent by the ephemeris information network element, wherein the signaling comprises the ephemeris information of the first satellite base stations.

12. The apparatus according to claim 11, wherein the one or more processors are enabled to:
determine a second time based on the ephemeris information, wherein the second time is a start time of covering the terminal device by the satellite base stations covering the terminal device;
determine second satellite base stations based on the second time, wherein the second satellite base stations are satellite base stations that are to cover the terminal device after a current moment; and determine distances between the second satellite base stations and the terminal device based on ephemeris information of the second satellite base stations and the position information of the terminal device, and determine a nearest satellite base station of the second satellite base stations as the destination satellite base station.

13. The apparatus according to claim 12, wherein the one or more processors are enabled to determine a movement speed of the destination satellite base station based on the ephemeris information of the destination satellite base station, and determine the first time based on the movement speed of the destination satellite base station, a movement speed of the terminal device, and a specified handover advance.

14. The apparatus according to claim 10, wherein the one or more processors are enabled to receive a broadcast message, wherein the broadcast message comprises at least one of the following parameters:
identification information of the first satellite base stations and identification information, coverage times, and longitude and latitude information that are of cells comprised in the first satellite base stations, and in the coverage times, the cells comprised in the first satellite base stations cover positions represented by the longitude and latitude information.

15. The apparatus according to claim 14, wherein the one or more processors are enabled to:
determine, by the terminal device based on the identification information of the first satellite base stations and the identification information, the coverage times, and the longitude and latitude information that are of the cells comprised in the first satellite base stations, a cell that is of the cells comprised in the first satellite base stations and that first covers the terminal device; and
determine, as the destination satellite base station, a base station to which the cell that first covers the terminal device belongs.

16. The apparatus according to claim 15, wherein the one or more processors are enabled to determine the first time based on the coverage time of the destination satellite base station and a specified handover advance.

17. The communication apparatus according to claim 10, wherein the communication apparatus is a terminal device or a chip.

18. A computer-readable storage medium, comprising a computer program, wherein when the computer program is executed on a computer to operate to carry out a handover method in satellite communications that uses a satellite constellation in a non-geosynchronous satellite orbit-based communications system, the communications apparatus, wherein the method comprises:
obtaining ephemeris information of first satellite base stations, wherein the first satellite base stations are satellite base stations that cover a terminal device, wherein the ephemeris information, for a satellite base station of the first satellite base stations, includes:
an angle of inclination of an orbital plane of the satellite,
a semi-major axis of an orbital ellipse,
an eccentricity of the orbital ellipse,
a right ascension of an ascending node, and
an angular distance of a perigee;
determining, based on the ephemeris information, a destination satellite base station to which the terminal device needs to hand over;
determining, based on the determined destination satellite base station, a first time at which the terminal device is to hand over to the destination satellite base station; and
handing over, based on the determined first time, to a destination cell served by the destination satellite base station.

19. The computer-readable storage medium according to claim 18, wherein the computer is enabled to:
send an ephemeris information request to an ephemeris information network element, wherein the ephemeris information request comprises position information of the terminal device; and
receive signaling sent by the ephemeris information network element, wherein the signaling comprises the ephemeris information of the first satellite base stations.

20. The computer-readable storage medium according to claim 19, wherein determining, based on the ephemeris information, the destination satellite base station to which the terminal device needs to hand over comprises:
determining a second time based on the ephemeris information, wherein the second time is a start time of covering the terminal device by satellite base stations covering the terminal device;
determining second satellite base stations based on the second time, wherein the second satellite base stations are satellite base stations that are to cover the terminal device after a current moment; and
determining distances between the second satellite base stations and the terminal device based on ephemeris information of the second satellite base stations and the position information of the terminal device, and determining a nearest satellite base station of the second satellite base stations as the destination satellite base station.

21. The computer-readable storage medium according to claim 20, wherein determining, based on the determined destination satellite base station, the first time at which the terminal device is to hand over to the destination satellite base station comprises:
determining, by the terminal device, a movement speed of the destination satellite base station based on ephemeris information of the destination satellite base station, and determining the first time based on the movement speed of the destination satellite base station, a movement speed of the terminal device, and a specified handover advance.

22. The computer-readable storage medium according to claim 18, wherein the computer is enabled to receive a broadcast message, wherein the broadcast message comprises at least one of the following parameters:
identification information of the first satellite base stations and identification information, coverage times, and longitude and latitude information that are of cells comprised in the first satellite base stations, and in the coverage times, the cells comprised in the first satellite base stations cover positions represented by the longitude and latitude information.

23. The computer-readable storage medium according to claim 22, wherein determining, based on the ephemeris information, the destination satellite base station to which the terminal device needs to hand over comprises:
determining, based on the identification information of the first satellite base stations and the identification information, the coverage times, and the longitude and latitude information that are of the cells comprised in the first satellite base stations, a cell that is of the cells comprised in the first satellite base stations and that first covers the terminal device; and determining, as the destination satellite base station, a base station to which the cell that first covers the terminal device belongs.

\* \* \* \* \*